United States Patent Office 2,722,488
Patented Nov. 1, 1955

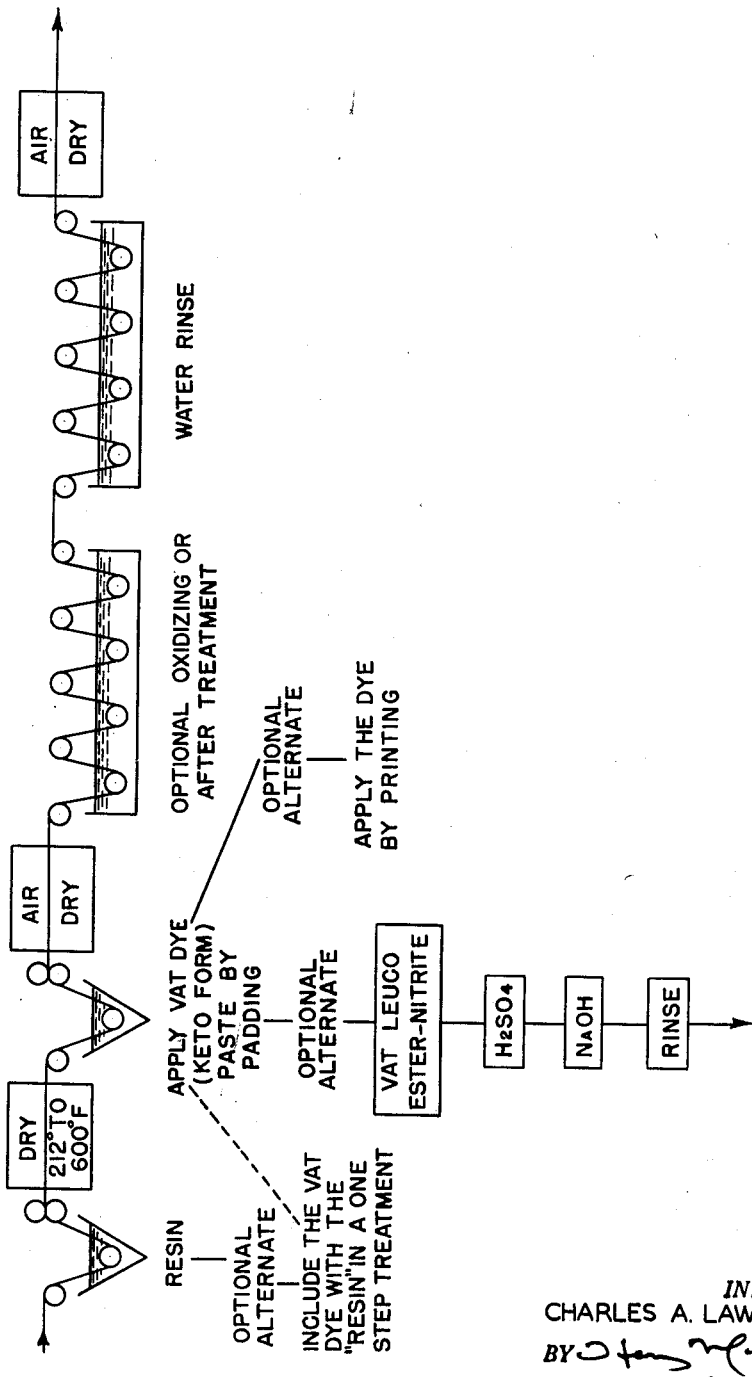

2,722,488

PROCESS OF COLORING GLASS FABRICS WITH A RESINOUS COATING DYED WITH A VAT DYE

Charles L. Lawsberg, Easton, Pa., assignor to General Aniline & Film Corporation, New York, N. Y., a corporation of Delaware Application August 16, 1952, Serial No. 304,711

14 Claims. (Cl. 117—126)

This invention relates to processes for coloring glass fabrics with vat dyes, and more particularly to the coating of said fabrics with a water-insoluble resinous inter-reaction product of a water-soluble resinous polyhydroxy compound and a water-soluble interpolymer of maleic anhydride with a member of the group consisting of vinyl methyl ether, vinyl ethyl ether, and vinyl acetate, and applying thereto a vat dye in the ordinary keto form or as the alkali salt of the leuco (anthrol) form followed by conversion to the keto form. Preferably, the vat dye is applied after formation of the cured resinous coating on the fabric; however, if desired, the keto form may be applied together with the resin-forming materials, whereby the resin application and dyeing are carried out in one step. The invention also relates to he resulting dyed glass fabrics.

Glass fabrics are known and have achieved considerable commercial success. Generally, they are prepared by making fine glass strands, twisting the strands into yarn, and weaving the yarn into a fabric. Sizing or coating materials are used to protect the yarns during the weaving, and these may be removed from the fabric by boiling with water which may contain a detergent, in known manner. In an alternative method, the woven glass fabric is subjected to a heat treatment at about 1200 to 1300° F. for up to about ten seconds, whereby the sizing is burned off, and the fabric is rendered soft and pliable and is set with a permanent crimp which gives the fabric wrinkle resistance.

Inasmuch as glass fabrics are used for decorative purposes, their commercial acceptance is related to the variety of colors in which they may be obtained, and also the quality of the coloring. Great difficulty has been encountered in dyeing glass fabrics, and generally the number of colors obtainable is rather limited, and the resulting colored fabrics leave much to be desired from the quality standpoint, e. g. resistance to crocking.

The series of anthraquinone vat dyes provides a wide range of colors of good stability. However, it has not been possible in the past to provide glass fabrics with these anthraquinone vat dye colors; and the art has been confronted with the problem of providing glass fabrics colored with anthraquinone vat dye colors and having good resistance to crocking as well as other desirable features.

It has been found in accordance with the invention that glass fabrics may be provided with a wide range of anthraquinone vat dye colors if the fabric is provided with a water-resistant resinous coating of a reaction product of a water-soluble interpolymer of maleic anhydride with vinyl methyl ether, vinyl ethyl ether, or vinyl acetate, and a water-soluble resinous polyhydroxy compound, preferably polyvinyl alcohol; and the anthraquinone vat dye color may be applied thereto after formation of the cured resin on the fabric, or alternatively, the vat dye in keto form may be applied together with the resin-forming ingredients, so that the formation of the resinous coating and the dyeing are carried out in one step.

The objects achieved in accordance with the invention as described herein include the provision of a method of coloring glass fabrics with anthraquinone vat dyes to give colored fabrics having good resistance to crocking; the provision of a method of coloring glas fabrics by applying thereto a water-insoluble resinous coating of an inter-reaction product of a water-soluble resinous polyhydroxy compound and a water-soluble interpolymer of maleic anyhdride and a member of the group consisting of vinyl methyl ether, vinyl ethyl ether, and vinyl acetate, and dyeing the fabric with an anthraquinone vat dye in keto form or alkaline vat leuco (anthrol) form followed by conversion to the keto form; the provision of anthraquinone vat dyed glass fabrics having a water-insoluble resinous coating of an inter-reaction product of a water-soluble resinous polyhydroxy compound and a water-soluble resinous polyhydroxy compound and a water-soluble interpolymer of maleic anhydride and a member of the group consisting of vinyl methyl ether, vinyl ethyl ether, and vinyl acetate; and other objects which will be apparent as details or embodiments of the invention are set forth hereinafter.

The attached drawing is a general flow diagram illustrating the invention, including several optional alternative procedures.

In order to facilitate a clear understanding of the invention, the following preferred specific embodiments are described in detail:

EXAMPLE 1

A cleaned or heat treated glass fabric (as described above) is padded with an aqueous solution containing 1% (or from about 0.5 to 2%) by weight of water-soluble polyvinyl alcohol and water-soluble interpolymer of maleic anhydride and methyl vinyl ether, at a temperature of about 140° F. (wet pickup about 25 to 40%), then it is dried and heated at about 300° F. for about 1 to 30 minutes, whereby the resin is converted to water-insoluble form. Then the fabric is padded with an aqueous dispersion of 10 parts of Indanthrene Brilliant Green BN Double Paste (Color Index No. 1101) into 200 parts of water, maintained at 120° F. In this step, the dye is in the oxidized or keto form. The fabric is then air-dried at room temperature for about ½ to 3 hours; or at higher air temperatures up to 212° F. for about 3 to 60 minutes.

Optionally, the resulting fabric may be after-treated in a solution of 0.2 part by weight sodium bichromate, 2 parts 28% aqueous acetic acid and 400 parts of water, maintained at 140° F., for about 15 minutes; then the fabric is thoroughly rinsed with water and air-dried.

Alternatively, after the dyeing and air-drying, the fabric may be treated with a 1 to 2% by weight aqueous solution of stearato-chromic chloride, at about 120 to about 180° F. for about 10 to 20 minutes, and then air-dried. This alternative oxidation treatment also imparts water repellency to the fabric.

The dyeings obtained by the above-described methods are even and show little or no crocking, excellent dry-cleaning properties, and a lightfastness better than 80 hours by exposure to a mercury arc light (by the usual Fade-ometer method). These fabrics also withstand the wash test #2 of the 1948 Year Book of the American Association of Chemists and Colorists.

The aqueous resin mixture used in the first treating step may be prepared by mixing 3.9 parts by weight of interpolymer of maleic anhydride with methyl vinyl ether (specific viscosity of about 2.0) in 126.5 parts of water and agitating. A separate solution, prepared by dissolving 6.75 parts of polyvinyl alcohol (commercially available as Elvanol, Type B, Grade 71-24, not completely hydrolyzed) in 83.25 parts of distilled water with high speed propeller agitation, at 85–90° C., then cooling to about room temperature, is mixed with the above solution. A small amount of sodium carbonate or similar alkaline material is added to the mixture to bring the pH in the range of about 3.5 to about 3.7.

In an optional alternative procedure, the glass fabric may be pretreated with an aqueous solution of an alkaline material yielding a pH in the range of 9 to 13, preferably sodium hydroxide, at a temperature in the range of about 120° F. to the boiling point of the aqueous solution. A small amount of a dispersant such as crude lignin sulfonate or Blancol (sodium naphthalene disulfonate-formaldehyde) may be added to this solution. This treatment should be carried out for a time in the range of about 15 to 60 minutes; the shorter times being used with higher temperatures or higher concentrations of the alkali. After the treatment, the fabric may be passed through squeeze rolls as in an ordinary padding process, and then dried, e. g. at an elevated temperature up to about 212° F. Then the fabric is subjected to the above-described resin and dyeing treatments. Generally, this pretreatment results in more even dyeings; and the advantages thereof are more apparent with glass fabrics which are not subjected to the above-described high temperature heat treatment.

EXAMPLE 2

Glass fabric is treated similarly to Example 1, except that the dye is applied in the alkaline vat or leuco form. The vat is prepared by treating 10 parts by weight of the dye paste with 1 to 4 parts of sodium hydroxide and 1 to 4 parts of sodium hydrosulfite in the presence of a dispersing agent such as Blancol.

Alternatively, the dye may be used in the form of an Algosol or an Indigosol. For example, the fabric is padded (as in Example 1) with 10 parts of Algosol Blue IBC (Color Index No. 1113) dissolved in 150 parts of water containing 0.5 to 3 parts of sodium nitrite, then treated with 1 to 5% aqueous sulfuric acid at 75 to 150° F., and then with dilute (1 to 5%) aqueous ammonium hydroxide, soda ash or the like weakly alkaline material, and dried. Comparable results to the foregoing are obtained.

EXAMPLE 3

Glass fabric is treated similarly to Example 1, except that the vat dye paste (keto form) is mixed with the aqueous resin mixture, so that both the resin and dye are applied together, and then the resin is dried and cured. The dyed fabrics obtained are desirable, but not as good as those of Example 1. They are somewhat less even, and also have more stiffness.

EXAMPLE 4

Glass fabric is treated similarly to Example 1, except that the vat dye paste (keto form) is applied to the glass fabric by printing, instead of padding. The resulting dyed fabrics are comparable to those obtained by the procedure of Example 1.

Comparable results to the foregoing are obtained with various modifications, such as the following:

The resin pickup is very small, e. g. in the range of 0.0001 to about 1.0% based on the weight of the flexible glass fabric, dry basis of the cured resin; and the wet pickup is adjusted accordingly, in the range of 10 to 100%. The amount of resin is kept low or at a minimum to give suitable dyeings, so as to preserve the drape and handle properties of the fabric, except where some added stiffness is desirable.

Instead of the above-mentioned copolymer, a copolymer of maleic anhydride with ethyl vinyl ether or vinyl acetate may be used. However, such copolymers with a higher alkyl vinyl ether should be avoided; for instance, markedly poorer results are obtained with corresponding copolymers of maleic anhydride with butyl vinyl ether. The specific viscosity of the copolymer should be in the range of 0.2 to 10, preferably in the range of 1 to 4 (as determined with a one-gram solution of the copolymer in 100 ml. of methyl ethyl ketone, at 25° C.).

Other types of polyvinyl alcohol may be used, such as at least 77% hydrolyzed polyvinyl acetate. Far-hydrolyzed material is preferable, i. e. up to about 99% hydrolyzed. The commercial high, medium or low viscosity types are suitable. These materials are characterized as showing a viscosity in a Hoeppler Viscosimeter of a 4% by weight aqueous solution, at 20° C., of 40 centipoises for the high, 20 for the medium, and 5 for the low. They are also characterized as showing a viscosity under similar conditions of a 4% by weight solution of the polyvinyl alcohol in 50% aqueous isopropanol, of 110 centipoises for the high and 55 for the medium. Other polyhydroxy materials having a proportionate hydroxyl content and viscosity characteristics comparable to polyvinyl alcohol may be used; such as hydroxyethylcellulose, ethyl hydroxyethylcellulose, hydroxyethylcarboxymethyl cellulose, and the like.

Generally from 1 to 3 parts by weight of the polyhydroxy compound is used per part of the copolymer, and an aqueous solution containing about 40 parts by weight of the copolymer and 60 parts by weight of the polyvinyl alcohol is preferred.

The pH of the resin treating bath should be in the range of from 2 to about 4.5. Higher pH's tend to give a final product which is not very fast to washing or laundering.

The other anthraquinone vat dyes give comparable results, and these may be typified by:

| Dye | Color Index No. |
|---|---|
| Indanthrene Blue BFP, Double Paste | 1113 |
| Indanthrene Brown RN, Double Paste | 1151 |
| Indanthrene Orange RRTA, Paste Fine | 1098 |
| Indanthrene Red RK, Double Paste | 1162 |

| Dye | Pr. No.[1] |
|---|---|
| Indianthrene Golden Yellow RKA, Double Paste | 292 |
| Indanthrene Red FBBA, Double Paste | 296 |
| Indanthrene Direct Black RBA, Paste | 289 |
| Indanthrene Golden Orange 3GA, Paste | 290 |
| Indanthrene Olive Green BA, Double Paste | 293 |
| Indanthrene Brilliant Orange RKA, Paste | 116 |
| Indanthrene Dark Blue BOD, Paste | 1099 |
| Indanthrene Khaki GGA, Paste | 122 |
| Indanthrene Red Brown 5RF, Paste (copper-free) | 448 |

[1] The foreign prototype number taken from the 1951 Year Book and Technical Manual of the American Association of Textile Chemists and Colorists, volume 27.

The temperature in the resin application step should be in the range of from 100 to 160° F., preferably about 140 to 150° F. In the dyeing step, the temperature should be from 100 to 150° F., preferably about 120 to 125° F. In the optional alkaline pretreating step, the temperature should be in the range of 120° F. to the boiling point, preferably about 180° F. The drying and heating step, after the application of the aqueous resin materials, should be in the range of 212 to 600° F., preferably about 300 to 500° F., and should be carried out for a sufficient time, e. g. in the range of about 5 to 60 minutes, to dry and cure the resin; i. e., to form a water-insoluble resin. For the higher temperatures, the shorter treating times are used.

In the optional alkaline pretreating step, suitable alkaline materials are ammonium hydroxide, sodium carbonate, ethanolamine, potassium hydroxide, trisodium phosphate, sodium metasilicate, lithium carbonate, tripotassium phosphate, and the like. The amount of such materials used in the aqueous solution may be varied over a wide range, provided the amount is sufficient to provide a solution having a pH of 9 to 13, preferably about 11. The alkaline solution may additionally contain water-soluble dispersants such as formaldehyde-dicyandiamide condensate, melamineformaldehyde condensate or animal glue. Alternatively, it may contain sodium or the like salts such as borates, chlorides, sulfates, phosphates, lignin sulfonates, acetates, formates, propionates, and the like.

The process of the invention is equally applicable to glass fibers or yarns, but for economic reasons, it is preferred to apply the treatment after the fibers or yarns are formed into a fabric.

In view of the foregoing disclosures, variations and modifications of the invention will be apparent to one skilled in the art, and it is intended to include within the invention all such variations and modifications except as do not come within the scope of the appended claims.

I claim:

1. A process for coloring glass fabrics which comprises coating said fabrics with a ½ to 2% by weight aqueous solution of a mixture of a water-soluble resinous polyhydroxy compound selected from the group consisting of polyvinyl alcohol, hydroxyethyl cellulose, ethylhydroxyethyl cellulose, and hydroxyethylcarboxymethyl cellulose, and a water-soluble interpolymer of maleic anhydride with a member of the group consisting of vinyl methyl ether, vinyl ethyl ether and vinyl acetate, which mixture has a pH of about 2 to about 4.5 and forms a water-insoluble resin upon drying at 212 to 600° F., drying and heating at a temperature in the range of 212 to 600° F. to form the insoluble resin and applying thereto a vat dye selected from the group consisting of the keto form of the dye and the alkaline anthrol form of the dye which is converted by oxidation to the keto form.

2. A process of claim 1 wherein the dye is applied after drying the resin.

3. A process of claim 1 wherein the dye is applied simultaneously with the resin-forming mixture.

4. A process of claim 3 wherein the polyhydroxy compound is polyvinyl alcohol.

5. A process of claim 4 wherein the interpolymer is of maleic anhydride with methyl vinyl ether.

6. A process of claim 4 wherein the interpolymer is of maleic anhydride with ethyl vinyl ether.

7. A process of claim 4 wherein the interpolymer is of maleic anhydride with vinyl acetate.

8. A process of claim 4 wherein the glass fabric is pretreated with an aqueous alkaline solution having a pH in the range of 9 to 13 at a temperature in the range of 120° F. to the boiling temperature of the solution.

9. A process of claim 2 wherein the dyed fabric is aftertreated with an oxidizing chromic compound.

10. A dyed glass fabric obtained by the process of claim 1.

11. A process of claim 5 wherein the vat dye is applied in keto form.

12. A process of claim 2 wherein the polyhydroxy compound is polyvinyl alcohol.

13. A process of claim 12 wherein the interpolymer is of maleic anhydride with methyl vinyl ether.

14. A process of claim 13 wherein the vat dye is applied in keto form.

References Cited in the file of this patent

UNITED STATES PATENTS

| | | |
|---|---|---|
| 2,259,225 | Kienle | Oct. 14, 1941 |
| 2,273,040 | Iler | Feb. 17, 1942 |
| 2,407,483 | Ebaugh | Sept. 10, 1946 |
| 2,448,515 | Carroll | Sept. 7, 1948 |
| 2,469,409 | Powers et al. | May 10, 1949 |
| 2,609,350 | Spatt | Sept. 2, 1952 |
| 2,645,553 | Lawsberg | July 14, 1953 |

FOREIGN PATENTS

| | | |
|---|---|---|
| 559,329 | Great Britain | Feb. 15, 1944 |
| 650,682 | Great Britain | Feb. 28, 1951 |